US009537884B1

(12) United States Patent
Raugas et al.

(10) Patent No.: US 9,537,884 B1
(45) Date of Patent: Jan. 3, 2017

(54) ASSESSMENT OF CYBER THREATS

(71) Applicant: Cyberpoint International LLC, Baltimore, MD (US)

(72) Inventors: Mark V. Raugas, Baltimore, MD (US); James L. Ulrich, Potomac, MD (US)

(73) Assignee: Cyberpoint International LLC, Baltimore, MD (US)

( * ) Notice: Subject to any disclaimer, the term of this patent is extended or adjusted under 35 U.S.C. 154(b) by 0 days.

(21) Appl. No.: 15/170,369

(22) Filed: Jun. 1, 2016

(51) Int. Cl.
*H04L 29/06* (2006.01)

(52) U.S. Cl.
CPC ....... *H04L 63/1433* (2013.01); *H04L 63/1441* (2013.01)

(58) Field of Classification Search
CPC .................. H04L 63/1433; H04L 63/1441
See application file for complete search history.

(56) References Cited

U.S. PATENT DOCUMENTS

| 6,944,656 | B2 | 9/2005 | Evrard et al. | |
|---|---|---|---|---|
| 7,818,797 | B1 * | 10/2010 | Fan | G06F 21/55 726/22 |
| 7,890,869 | B1 * | 2/2011 | Mayer | G06F 21/577 709/224 |
| 8,272,061 | B1 * | 9/2012 | Lotem | G06F 21/577 709/223 |
| 8,407,798 | B1 * | 3/2013 | Lotem | G06F 21/55 726/18 |
| 9,043,922 | B1 * | 5/2015 | Dumitras | G06F 21/577 726/25 |
| 9,143,523 | B2 | 9/2015 | Evrard | |
| 9,288,224 | B2 | 3/2016 | King-Wilson | |
| 9,294,495 | B1 * | 3/2016 | Francoeur | H04L 63/1433 |
| 9,363,279 | B2 | 6/2016 | Evrard | |
| 9,373,144 | B1 * | 6/2016 | Ng | G06Q 40/06 |
| 2003/0144823 | A1 * | 7/2003 | Fox | G01N 33/5091 703/11 |
| 2006/0021034 | A1 * | 1/2006 | Cook | H04L 63/20 726/22 |
| 2006/0109793 | A1 * | 5/2006 | Kim | H04L 41/145 370/250 |
| 2006/0218640 | A1 * | 9/2006 | Lotem | H04L 63/1433 726/25 |

(Continued)

OTHER PUBLICATIONS

Frigault, Marcel et al. "Measuring Network Security Using Dynamic Bayesian Network" In: Proceedings of 4th ACM QoP, 2008.*

(Continued)

*Primary Examiner* — Darren B Schwartz
(74) *Attorney, Agent, or Firm* — Fish & Richardson P.C.

(57) ABSTRACT

Methods, systems, and apparatus, including computer programs encoded on a computer storage medium, for assessing cyber threats. In some implementations, data indicating a time window is received. Data indicating at least one dynamic Bayesian network (DBN) is accessed. A plurality of simulations are performed using the DBN, and outcomes of the plurality of simulations are sampled according to the state of the DBN representing the end of the time window. Based on the sampled outcomes of the simulations, a measure of impact of the computer-based threats to the organization over the time window is determined. The determined measure is provided for output to a user.

20 Claims, 7 Drawing Sheets

(56) References Cited

U.S. PATENT DOCUMENTS

| | | | | |
|---|---|---|---|---|
| 2006/0265324 | A1* | 11/2006 | Leclerc | G06F 21/577 705/38 |
| 2008/0098479 | A1* | 4/2008 | O'Rourke | H04L 63/1433 726/25 |
| 2009/0319247 | A1* | 12/2009 | Ratcliffe, III | G09B 19/0053 703/13 |
| 2010/0095381 | A1* | 4/2010 | Levi | G06F 21/577 726/25 |
| 2012/0159624 | A1* | 6/2012 | Konig | G06F 21/577 726/23 |
| 2013/0055404 | A1* | 2/2013 | Khalili | G06Q 10/00 726/25 |
| 2013/0325545 | A1* | 12/2013 | Mordvinova | G06Q 10/06 705/7.28 |
| 2015/0047032 | A1* | 2/2015 | Hannis | H04L 63/1491 726/23 |
| 2015/0295948 | A1* | 10/2015 | Hassell | H04L 63/1441 726/25 |
| 2015/0381649 | A1* | 12/2015 | Schultz | H04L 63/1433 726/25 |

OTHER PUBLICATIONS

Raugas et al., "CyberV@R: A Cyber Security Model for Value at Risk." Retrieved from the Internet: <URL: https://www.cyberpointllc.com/docs/CyberVaR.pdf>, 45 pages, Jan. 7, 2013.
"CWE, Common Weakness Enumeration." Retrieved from the Internet: <URL: http://cwe.mitre.org/about/index.html>, 5 pages, 2015.
"Nessus Features." Retrieved from the Internet: <URL: http://www.tenable.com/products/nessus/features>, 5 pages, archived Jun. 15, 2015.
"Rapid 7." Retrieved from the Internet: <URL: https://www.rapid7.com/products/nexpose/>, 8 pages, May 3, 2015.
Aggarwal, "It's all about your assets at risk." Retrieved from the Internet: <URL: https://baydynamics.com/blog/its-all-about-your-assets-at-risk/>, 4 pages, Jun. 2, 2016.
ANSI, "The Financial Impact of Breached Protected Health Information." Retrieved from the Internet: <URL: http://isalliance.org/publications/1C.%20The%20Financial%20Impact%20of%20Breached%20Protected%20Health%20Information%20-%20A%20Business%20Case%20for%20Enhanced%20PHI%20Security%20-%202012.pdf>, 146 pages, 2012.
Beckstrom et al., "CyberVaR. Quantifying the risk of loss from cyber attacks." Retrieved from the Internet: <URL: http://www.beckstrom.com/uncategorized/cybervar-quantifying-risk-loss-cyber-attacks/>, 4 pages, Dec. 16, 2014.
Buith, "The Benefits, Limits of Cyber Value-at-Risk," CIO Journal. Retrieved from the Internet: <URL: http://deloitte.wsj.com/cio/2015/05/04/the-benefits-limits-of-cyber-value-at-risk/>, 3 pages, May 4, 2015.
Chien et al., "The Nitro Attacks: Stealing Secrets from the Chemical Industry," Symantec Security Response. Retrieved from the Internet: <URL: https://www.symantec.com/content/en/us/enterprise/media/security_response/whitepapers/the_nitro_attacks.pdf>, 8 pages, Oct. 2011.
Crovitz, "Cybersecurity 2.0," The Wall Street Journal, 4 pages, Feb. 27, 2012.
CyberPoint International, "Welcome to libpgm." Retrieved from the Internet: <URL: https://pythonhosted.org/libpgm/>, 3 pages, 2012.
Department of Energy (DOE), "Electricity Subsector Cybersecurity: Risk Management Process." Retrieved from the Internet: <URL: http://energy.gov/sites/prod/files/RMP%20Guideline%20Second%20Draft%20for%20Public%20Comment%20-%20March%202012.pdf>, 89 pages, Mar. 2012.
Department of Homeland Security (DHS), "Information Technology Sector Baseline Risk Assessment." Retreived from the Internet: <URL: https://www.dhs.gov/xlibrary/assets/nipp_it_baseline_risk_assessment.pdf, 114 pages, Aug. 2009.
Department of Homeland Security (DHS), "Information Technology Sector Risk Management Strategy for the Provide Domain Name Resolution Services Critical Function." Retrieved from the Internet: <URL: https://www.dhs.gov/xlibrary/assets/it-sector-risk-management-strategy-domain-name-resolution-services-june2011.pdf>, 26 pages, Jun. 2011.
Doherty et al., "Trojan.Taidoor: Targeting Think Tanks," Symantec Security Response. Retreived from the Internet: <URL: https://www.symantec.com/content/en/us/enterprise/media/security_response/whitepapers/trojan_tai.door-targeting_think_tanks.pdf>, 19 pages, Mar. 2012.
Executive Office of the President of the United States, "The Comprehensive National Cybersecurity Initiative." Retrieved from the Internet: <URL: https://www.whitehouse.gov/sites/default/files/cybersecurity.pdf>, 5 pages, Mar. 2010.
Falliere et al., "W32.Stuxnet Dossier," Symantec Security Response. Retrieved from the Internet: <URL: http://www.symantec.com/security_response/whitepapers.jsp>, 69 pages, Feb. 2011.
Falliere et al., "Zeus: King of the Bots," Symantec Security Response. Retreived from the Internet: <URL: https://www.symantec.com/content/en/us/enterprise/media/security_response/whitepapers/zeus_king_of_bots.pdf>, 14 pages, 2009.
Gordon et al., "The Economics of Information Security Investment." Retrieved from the Internet: <URL:http://sec2013.crysys.hu/~mfelegyhazi/courses/EconSec/readings/04_GordonL02economics_security_investment.pdf>, ACM Transactions on Information and System Security, vol. 5., No. 4, pp. 438-457, Nov. 2002.
ISA / ANSI, "The Financial Management of Cyber Risk." Retrieved from the Internet: <URL: https://share.ansi.org/khdoc/Financial+Management+of+Cyber+Risk.pdf>, 76 pages, 2010.
Kirkpatrick al., "Optimization by Simulated Annealing," Science, vol. 220, pp. 671-680, 1983.
Kullback et al., "On Information and Sufficiency," Annals of Mathematics, vol. 22, No. 1, 79-86, Mar. 1951.
Lee, "Towards Cybersecurity in Business Terms. Quantifying the Risk in Dollars." Retrieved from the Internet: <URL: http://www.isaca.org/chapters8/Silicon-Valley/Members/Documents/Conferences/2015%20 Spring%20Conference/2-2%20Thomas%20Lee%20%20-%20Cyber%20Security%20in%20Business%20Terms.pdf>, 25 pages, Jun. 1, 2015.
Lloyds, "Lloyd's Risk Index 2011." Retrieved from the Internet: <URL: https://www.lloyds.com/~/media/files/news%20and%20insight/360%20risk%20insight/lloyds_risk_index_2011.pdf>, 39 pages, 2011.
McAfee, "McAfee Risk Advisor Installation and Product Guide." Retreived from the Internet: <URL: https://kc.mcafee.com/resources/sites/MCAFEE/content/live/PRODUCT_DOCUMENTATION/22000/PD22131/en_US/mra20_epo40_product_guide[1].pdf>, 38 pages, 2009.
Mell et al., "CVSS: A Complete Guide to the Common Vulnerability Scoring System Version 2." Retrieved from the Internet: <URL: https://www.first.org/cvss/cvss-v2-guide.pdf>, 23 pages, Jun. 2007.
Morgan Guaranty Trust Company, "Risk Metrics Technical Document," 4th ed. Retreived from the Internet: <URL: https://www.msci.com/documents/10199/5915b101-4206-4ba0-aee2-3449d5c7e95a>, 296 pages, Dec. 17, 1996.
National Institute of Standards and Technology (NIST), "Recommended Security Controls for Federal Information Systems and Organizations," NIST Special Publication 800-53 Rev 3. Retrieved from the Internet: <URL: http://nvlpubs.nist.gov/nistpubs/Legacy/SP/nistspecialpublication800-53r3.pdf>, 238 pages, Aug. 2010.
National Institute of Standards and Technology (NIST), "The Technical Specification for the Security Content Automation Protocol (SCAP): SCAP Version 1.2," Special Publication 800-126 Revision 2. Retrieved from the Internet: <URL: http://nvlpubs.nist.gov/nistpubs/Legacy/SP/nistspecialpublication800-126r2.pdf>, 66 pages, Sep. 2011.
National Institute of Standards and Technology (NIST), U.S. Department of Commerce, "Managing Information Security Risk:

(56) References Cited

OTHER PUBLICATIONS

Organization, Mission, and Information System View," NIST Special Publication 800-39. Retrieved from the Internet: <URL: http://csrc.nist.gov/publications/nistpubs/800-39/SP800-39-final.pdf> 88 pages. Mar. 2011.
Pivot Point RA, "Defining Cyber Value at Risk." Retrieved from the Internet: <URL: http://www.pivotpointra.com/solutions/defining-cyber-value-at-risk/>, 2 pages, archived Mar. 18, 2016.
Poolsappasit et al., "Dynamic security risk management using Bayesian attack graphs," IEEE Transactions on Dependable and Secure Computing., 9(1):61-74, Jan. 2012.
Raftopoulos et al., "Detecting, validating and characterizing computer infections in the wild," Internet Measurement Conference, pp. 29-44. ACM, Nov. 2-4, 2011.
Robinson et al., "Learning Non-Stationary Dynamic Bayesian Networks", Journal of Machine Learning Research, vol. 11, pp. 3647-3680, Retreived from the Internet: <URL: http://www.jmlr.org/papers/volume11/robinson10a/robinson10a.pdf>, 34 pages, 2010.
Roy et al., "Cyber security analysis using attack countermeasure trees," In Proceedings of the Sixth Annual Workshop on Cyber Security and Information Intelligence Research, ACM. Retrieved from the Internet: <URL: https://www.semanticscholar.org/paper/Cyber-security-analysis-using-attack-Roy-Kim/418e81f07cb7fdc9fe3124fced0bd352eea278eb/pdf>, 4 pages, Apr. 21, 2010.
Salter et al., "Towards a Secure System Engineering Methodology," Proceedings of the 1998 workshop on New security paradigms. Retrieved from the Internet: <URL: https://www.schneier.com/academic/paperfiles/paper-secure-methodology.pdf>, 11 pages, 1998.
Sanna, "What is a Cyber Value-at-Risk Model?" Retrieved from the Internet: <URL: http://www.fairinstitute.org/blog/what-is-a-cyber-value-at-risk-model>, 8 pages, Jan. 28, 2016.
Sanna, "What is a Cyber Value-at-Risk Model?" Retrieved from the Internet: <URL: https://www.linkedin.com/pulse/what-cyber-value-at-risk-model-nicola-nick-sanna>, 19 pages, Jan. 28, 2016.
SANS Institute, "Critical Security Controls." Retrieved from the Internet: <URL: http://www.sans.org/critical-security-controls/>, 6 pages, May 27, 2015.
Schneier, "Attack Trees," Dr. Dobb's Journal. Retrieved from the Internet: <URL: https://www.schneier.com/academic/archives/1999/12/attack_trees.html>, Dec. 1999.
The Mitre Corporation, "Common Attack Pattern Enumeration and Classification—CAPEC." Retrieved from the Internet: <URL: http://makingsecuritymeasurable.mitre.org/docs/capec-intro-handout.pdf>, 18 pages, Jul. 2013.
The Rendon Group, "Conficker Working Group: Lessons Learned." Retrieved from the Internet: <URL: http://www.confickerworkinggroup.org/wiki/uploads/Conficker_Working_Group_Lessons_Learned_17_June_2010_final.pdf>, 59 pages, Jan. 2011.
U.S. Securities and Exchange Commission, "Questions and Answers About the New 'Market Risk' Disclosure Rules." Retreived from the Internet: <URL: http://www.sec.gov/divisions/corpfin/guidance/derivfaq.htm#qvar>, 26 pages, Jul. 31, 1997.
Ulrich, "CyberV@R: A Model to Compute Dollar Value at Risk of Loss to Cyber Attack." Retrieved from the Internet: <URL: http://www.cert.org/flocon/2013/presentations/ulrich-james-cybervar.pdf>, 24 pages, Jan. 9, 2013.
Wikipedia, "ArcSight." Retrieved from the Internet: <URL: https://en.wikipedia.org/wiki/ArcSight>, 3 pages, last modified Jul. 31, 2015.
Wikipedia, "Bayesian network." Retrieved from the Internet: <URL: https://en.wikipedia.org/wild/Bayesian_network>, 7 pages, last modified Apr. 9, 2014.
Wikipedia, "JSON." Retrieved from the Internet: <URL: https://en.wikipedia.org/wiki/JSON>, 12 pages, last modified May 26, 2015.
Wikipedia, "Monte Carlo method." Retrieved from the Internet: <URL: https://en.wikipedia.org/wiki/Monte_Carlo_method>, 9 pages, last modified May 19, 2015.
World Economic Forum, "Partnering for Cyber Resilience." Retrieved from the Internet: <URL: http://www3.weforum.org/docs/WEFUSA_QuantificationofCyberThreats_Report2015.pdf>, 20 pages, Jan. 2015.

* cited by examiner

ASSESSMENT OF CYBER THREATS

BACKGROUND

This disclosure relates generally to assessing cyber threats and the risks they pose to organizations.

Computer-based threats to organizations have increased significantly in recent years. Organizations frequently are unable to determine the potential damage caused by cyber threats or the manner in which different attacks will evolve over time. While organizations may deploy some systems or procedures in attempt to mitigate computer-based threats, it is often difficult to determine the extent that mitigation measures may be effective in actually protecting an organization from intrusion and loss.

SUMMARY

In some implementations, a system for assessing cyber threats can take into account the progression of computer-based threats over time. The system can be used to determine, for a particular organization and its unique assets and network topology, measures of effects of various cyber threats. The system can further take into account threat mitigation measures employed by the organization and the likely effectiveness of these mitigation measures.

Implementations may include methods, systems, and media for specifying (1) an organization's computing infrastructure topology, at the level of individual deployed hardware, operating system, and application software units, or and/or aggregations thereof (each node of the topology may be called an access node); (2) a set of multi-stage cyber threats to which the organization is subject, including description of modes of operation, specific vulnerabilities used, and rates of incidence (each such threat instance may be called a threat thread comprising threat stages); (3) a set of hardware, software, personnel-based, physical, or organizational security mitigations deployed to partially or fully counteract the threats, including the specification of rates of effectiveness against particular threat types or exploits (each instance of such may be called a mitigation node); (4) the location and value of organizational assets, including electronic documents containing intellectual property, personally identifying information, or other computer-stored assets of determinate value (each such location may be termed an access node); and (5) the expression of the interrelatedness of these elements as a set of Dynamic Bayesian Networks (DBNs) encoding the possible forms of the time-evolution of the threats throughout the organization. Some or all of the information may be expressed in, for example, Java Simple Object Notation (JSON).

One or more embodiments may include methods, systems, and media for establishing, from the instances of the specifications of an organization's computing infrastructure topology, a set of multi-stage cyber threats, a set of hardware, software, personnel-based, physical, or organizational security mitigations, the location and value of organizational assets, and the expression of the interrelatedness of these elements as a set of DBNs, a confidence interval on the total losses of organizational assets due to the threats, over a fixed time window, via repeated Monte Carlo sampling of the DBNs.

In one general aspect, a method performed by one or more computers includes: receiving data indicating a time window; accessing, by the one or more computers, data indicating at least one dynamic Bayesian network (DBN) that specifies relationships among (i) infrastructure nodes representing the computing infrastructure of an organization, (ii) asset nodes indicating characteristics of the assets of the organization, (iii) threat nodes representing the computer-based threats, and (iv) mitigation nodes representing threat mitigation measures of the organization; performing a plurality of simulations using the DBN, each simulation involving propagating data through the DBN for various time steps within the time window; sampling outcomes of the plurality of simulations according to the state of the DBN representing the end of the time window; based on the sampled outcomes of the simulations, determining a measure of impact of the computer-based threats to the organization over the time window; and providing, for output to a user, the determined measure of impact of the computer-based threats to the organization over the time window.

In some implementations, determining the measure of impact of the computer-based threats comprises determining a confidence interval for losses of the organization due to the computer-based threats.

In some implementations, each asset node has an amount of value assigned. Performing the plurality of simulations comprises, for each of the plurality of the simulations, determining based on parameters assigned to the threat nodes and the mitigation nodes, whether a computer-based threat is successful in accessing the asset nodes. Sampling outcomes of the plurality of simulations comprises, for each simulation, determining a combined amount of value for the asset nodes that were determined to be accessed by the computer-based threats during the simulation.

In some implementations, performing the plurality of simulations and sampling the outcomes comprise performing Monte Carlo simulations and sampling of the DBN.

In some implementations, Monte Carlo simulations are conducted to determine a distribution of a total value that may be lost to the threats represented by the threat nodes, over the time window.

In some implementations, the method includes: determining a threshold value indicating a minimum level of accuracy; and determining a number of simulations needed to reach the minimum level of accuracy indicated by the threshold value. Performing the plurality of simulations comprises performing at least the determined number of simulations.

In some implementations, a particular cyber threat is represented in the DBN as a set of multiple threat nodes, each of the multiple threat nodes representing characteristics of a different stage.

In some implementations, the DBN represents a conditional probability distribution of each random variables is time-dependent for a discrete time index, and values determined for at least some of the nodes are conditioned on (i) the values of the node's parents at a current time index, and (ii) values determined for the node for one or more prior time indexes.

In one general aspect, a method performed by one or more computers includes: receiving, by the one or more computers, data indicating computing infrastructure of an organization and assets of the organization; receiving, by the one or more computers, data indicating computer-based threats to the organization and threat mitigation measures of the organization; generating, by the one or more computers, at least one dynamic Bayesian network (DBN) comprising (i) infrastructure nodes representing the computing infrastructure of the organization, (ii) asset nodes indicating characteristics of the assets of the organization, (iii) threat nodes representing the computer-based threats, and (iv) mitigation nodes representing the threat mitigation measures of the organization, the DBN indicating relationships among the nodes; and providing, by the one or more computers, an interface configured to provide data, generated using the DBN, that indicates effects of computer-based threats on the organization.

In some implementations, receiving the data indicating the computing infrastructure, the assets, the computer-based threats, or the threat mitigation measures comprises receiving the data from one or more client devices over a network.

In some implementations, the infrastructure nodes indicate (i) a network topology for the organization and (ii) individual deployed hardware, operating system, and application software units of the organization.

In some implementations, the infrastructure nodes indicate aggregations of networked computing devices of the organization.

In some implementations, the threat nodes indicate set of multi-stage computer-based threats, wherein for at least one of the multi-stage threats, the data indicates a mode of operation of the threat, a specific vulnerability exploited by the threat, and a rate of incidence of the threat.

In some implementations, each of the multi-stage computer-based threats is represented in the DBN by multiple threat nodes, each of the multiple threat nodes indicating characteristics of a different stage of the computer-based threat corresponding to a different time as an attack progresses.

In some implementations, the threat nodes represent multiple computer-based threats from the group consisting of a virus, malware, a network intrusion, data theft, and a denial of service attack.

In some implementations, the mitigation nodes indicate hardware, software, personnel-based, physical, or organizational security mitigations that are deployed, the mitigation nodes specifying one or more rates of effectiveness against particular types of computer-based threats.

In some implementations, the mitigation nodes represent multiple mitigations from the set consisting of an antivirus system, a network intrusion detection system, a firewall, a software patching process, a training program, a training program, a permission restriction scheme, a content-filtering process, an event logging process, a physical restriction, and an application whitelist.

In some implementations, the asset nodes indicate location and value of data assets of the organization, wherein the data assets comprises at least electronic documents and personally identifying information.

In some implementations, the method includes accessing data describing attack trees for different computer-based attacks, each attack tree including a graph describing interactions of a computer-based attack with one or more computers, each graph comprising multiple attack tree nodes that each represent a different stage of the computer-based attack; and wherein generating the DBN comprises generating the DBN based on the attack trees.

In some implementations, each stage of the computer-based attack may be characterized by one of several possible states, wherein one or more of the attack tree nodes is assigned a probability distribution that indicates a likelihood of the node's states conditioned on the states of the node's parents.

In some implementations, generating the DBN comprises generating the DBN to include a particular threat node representing a stage of a particular computer-based attack, the particular threat node having a conditional probability that is time-dependent for a discrete time index and is conditioned on (i) current states of parent nodes for the particular threat node, and (ii) a previous state of the particular threat node.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
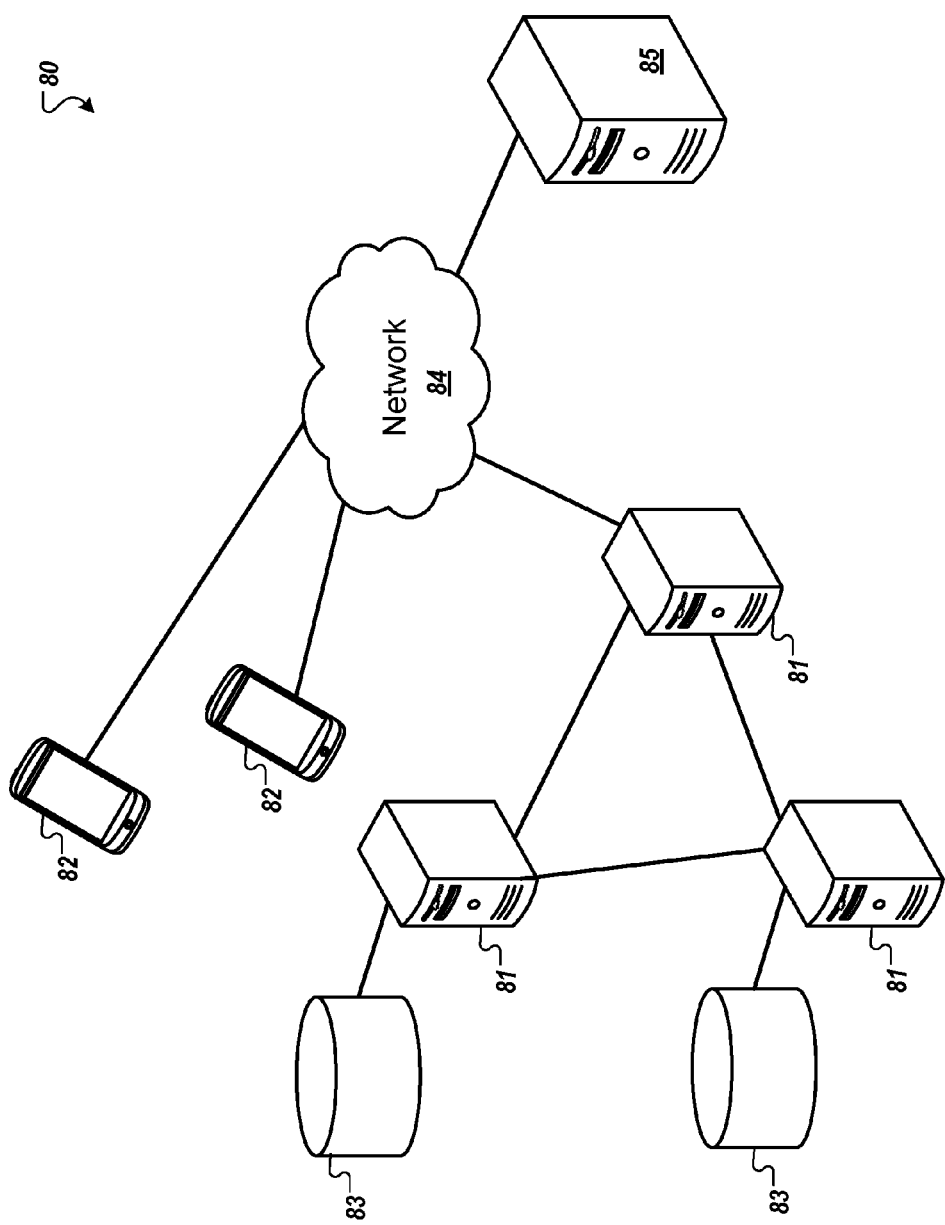
FIG. 1A illustrates an example of a system for assessing cyber threats.

FIG. 1 is a diagram that illustrates an example of a system 80 for assessing cyber threats, e.g., computer-based threats. The system 80 shows an example network infrastructure of an organization, including various computers 81, mobile devices 82, and data storage devices 83. These devices communicate with each other and with other devices, including communications over a network 84, which can include public and private networks and may include the Internet.

The system 80 includes an assessment system 85 that can include one or more computers. The assessment system 85 may be part of the network infrastructure of an organization, but in many implementations is operated by a third party. As discussed further below, the assessment system 85 receives information about the network infrastructure for an organization to model the risks and potential effects of computer-based attacks. This information can include the number and types of devices present, the manner in which they are connected, and so on. It can also indicate threat mitigations employed, e.g., network intrusion detection systems, firewalls, access restriction settings, and so on. Additionally, the assessment system 85 can receive information about the assets of the organization, including intellectual property stored on the storage devices 83. The assessment system 85 uses this information, which can be input directly or received over the network 84, to generate models of the particular risks that the organization faces due to various cyber threats.

The assessment system 85 can determine separate models for each of multiple organizations, with each organization's models being tailored for the organization's particular network infrastructure, threat mitigations, assets, and threats to which the organization is exposed. To generate and use these models, the assessment system 85 can include a variety of modules, which can be implemented using one or more computers. For example, the system 85 can include an input parser 100 to parse input about an organization, a network constructor 200 to build a network model, a sampler 300 to acquire data representing different scenarios that may affect the organization, and a calculator module 400 to generate outputs based on the acquired data. These modules and other aspects of the system are discussed below.

Figure 1B:
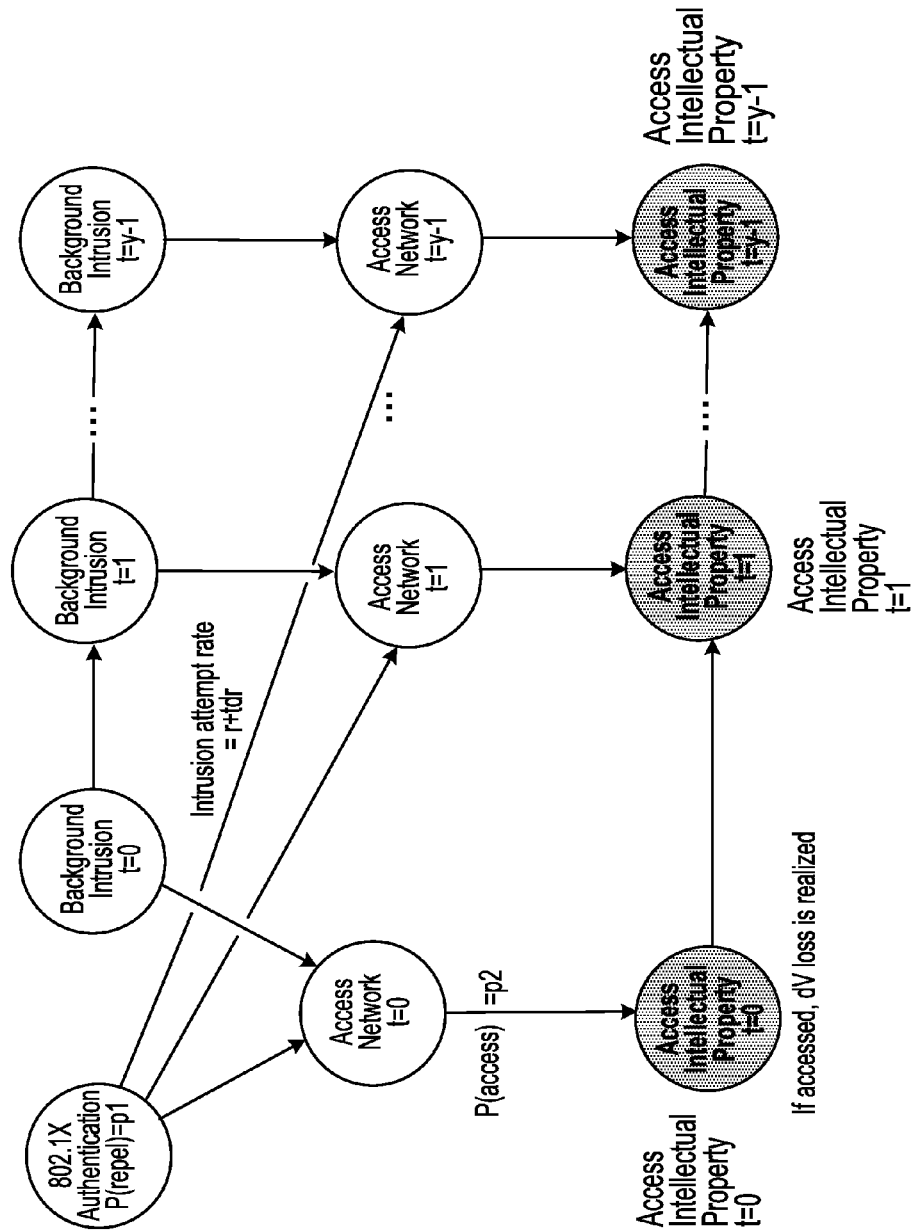
FIG. 1B depicts an exemplary structure of a Dynamic Bayesian Network that may be constructed for a given input in accordance with one or more embodiments.

FIG. 1B depicts an exemplary structure of a Dynamic Bayesian Network (DBN) that may be constructed for a given input in accordance with one or more embodiments. In general, risk models can be constructed as an aid to understanding the cyber threats to which an organization is exposed, and more specifically to the construction of models quantifying the risk. The disclosure discusses the specification and implementation of a model for assessing organizational value at risk which is a confidence interval for the total loss an organization will experience due to cyber threats of interest, interacting with the organization's computing infrastructure over a specified time window. An element of the disclosure is the use of computational techniques for value at risk in the cyber security domain, where the values are computed through repeated interaction simulations, conducted according to an encoding of the model parameters as a set of Dynamic Bayesian Networks, using Monte Carlo sampling techniques.

Methods, systems, and/or media may provide a framework for assessing organizational value at risk due to current and emerging cyber threats. CyberV@R is an example of one such framework. The framework for assessing organizational value at risk due to current and emerging cyber threats may include methods for (A) specifying, in Java Simple Object Notation (JSON):
 (1) an organizational computer network topology,
 (2) a set of cyber (that is, computer-based) threats to which the network is or may be subject,
 (3) a set of organizational assets deployed on the network and hence exposed to the threats, and
 (4) a set of security mitigations in force on the network, which may in whole or part mitigate the threats, and (B) for constructing, from the foregoing specification, a set of Dynamic Bayesian Networks (DBNs), via which:
 (5) Monte Carlo simulations may be conducted to assess the distribution of the total value of assets that may be lost to the threats, over a specified period of time, and from which
 (6) a confidence interval for losses (alternatively termed "cyber value at risk" or "cybervar") is ascertained, thus placing an overall value on the threats.

A Bayesian network is a technique for encoding as a graph the interdependency of a set of random variables to obtain a joint probability distribution for an event contained in the joint event space of the variables. Such networks may be constructed from Attack Trees, which are graphs describing the manner in which a cyber threat may interact with an organization's computing topology. Each node of the Attack Tree represents a particular stage of the attack, which may be characterized by one of several possible states (e.g. "success" or "failure"). In exemplary embodiments, a probability distribution giving the likelihood of the node's states may be assigned to each Attack Tree node, such that the distribution is conditioned on the states of the node's parents.

A dynamic Bayesian network (DBN) may be thought of as Bayesian network in which the conditional probability distribution of each random variables is time-dependent (for a discrete time index), and may therefore be conditioned not only on the values of variable's parents, at the current time, but also on the values of the variable itself, at prior times. Hence DBNs may be used to describe Attack Trees that evolve probabilistically through time. DBNs may be represented as one or more data structures. For example, DBNs may be naturally represented in a computer using an Object-Oriented programming language such as Python.

A DBN may define a framework for Monte Carlo simulations. Starting at an initial time, one samples each variable in the network, from top-level parents (roots) to bottom-level children (leaves). Based on the sampled values, the network is evolved one step forward in time, and the process is repeated again, up until a desired stopping time T. The values of each variable at time T represent the final state of the DBN, and this constitutes the outcome of one simulation. If each variable is real-valued, then one may conduct repeated simulations and average the outcomes to obtain an "expected outcome" for the network (or alternatively perform other, related statistical operations).

Java Simple Object Notation (JSON) is a semi-formal technique for describing the structure of various data elements, the relationships among the elements, and specific sets of instances of the elements and relations. JSON-based notation schemes have been developed, with which one may specify the structure of a JSON document (e.g., specify the document schema).

For example, an organization believes it is subject to an average of r attempts per day to access its computer network without authorization (this is termed the "background intrusion attempt rate"). Access to the network may be protected by an authentication scheme, e.g. an 802.xl-based network authentication scheme. The organization recognizes that the scheme, while normally successful at blocking such attempts, may fail with a small, estimated probability pI, due (for example) to compromised account credentials. Product designs deemed to have a value of V are stored on the network. The organization wishes to know the odds of losing more than 95% of the value of the assets, at any time over the next T days, to successful unauthorized access. This value might be used as a gauge of the adequacy of the organization's insurance against such events. Over T, the organization estimates that each day, the background intrusion rate will increase by an amount dr. The organization further estimates that any day on which one or more access attempts succeed, at most dV worth of assets is lost (this quantity may reflect, for example, the dispersion of the designs throughout the network).

The organization may use the methods described below to encode the foregoing information, e.g. as a JSON text file. However, the information may be encoded as any data structure and may be transferred in or as any type of file, as well as through other means of transmission, such as via Remote Procedure Call, sharing of objects, network connections, etc. FIG. 1 depicts an exemplary structure of a Dynamic Bayesian Network that may be constructed for a given input in accordance with one or more embodiments. The file is passed as input to a computer program implementing the framework. The program organizes the data into a DBN, e.g. by using the techniques discussed herein. It then proceeds to execute repeated simulation trials, up to a configured number reflecting the desired degree of computational accuracy. Each trial may be conducted in the following manner. For each day t in T, for each node of the DBN, from roots to leaves, a sample is drawn according to the probability distribution associated to the node. For the intrusion node, the sample represents the particular number n of access attempts that occur on day t, given the daily attempt rate r+t dr. Then a sample is drawn from the network node distribution p2. The sample takes value 1 if the network is accessed, and 0 otherwise; the odds of drawing 1 are dependent on n and p1. If the value 1 is drawn, then $dV*V(t)$ is lost on day t, and the remaining value $V(t+1)$ is set to $V(t)-dV*V(t)$. Let the (not necessarily consecutive) days on which losses occur be labeled $t\_1, t\_2, \ldots, t\_L$, respectively. Then for this trial, a total of $L=dV*(V\_t1)+dV*V(t\_2)+ \ldots +dV*V(t\_L)$ is lost.

Although examples are provided in which the trials are conducted using days as a time frame, the trials may be conducted at any interval (e.g. seconds, minutes, hours, days, years, months, etc.) and over any interval.

For example, suppose 100 such trials are conducted, resulting in loss amounts $L\_0$ through $L\_99$, where the values are sorted from lowest (least loss) to highest (greatest loss). Then the value $L\_95$ gives an estimate of the "5% cybervar amount", which is the amount such that the estimated odds of losing more than $L\_95$ over T fall below 5%.

Figure 2:
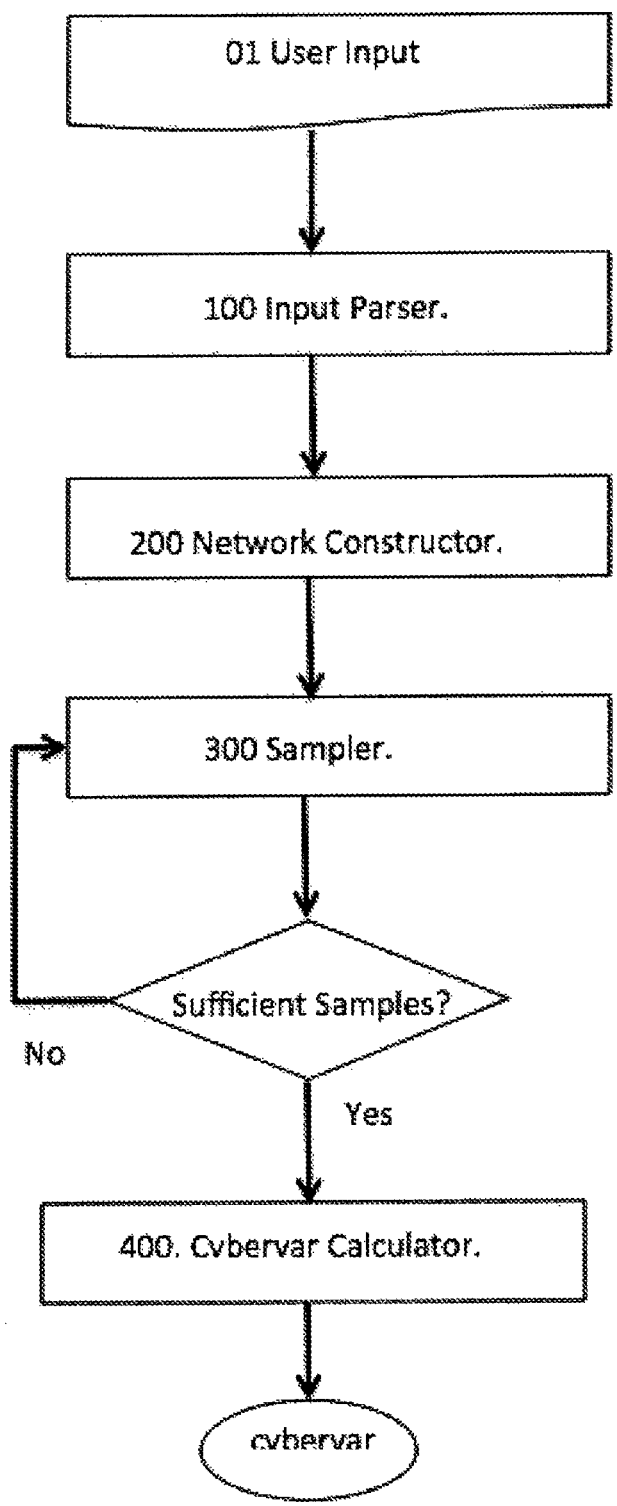
FIG. 2 depicts an exemplary processing flow across exemplary components in accordance with one or more embodiments.

FIG. 2 depicts an exemplary processing flow across exemplary components in accordance with one or more embodiments. The Input Processor 100 consumes and parses User Input 01, which is passed in parsed form to the Dynamic Bayesian Network Constructor 200, which constructs a set of DBNs based on the input. This set of networks is then passed to the Sampler 300, which conducts repeated simulations over the networks, to obtain a distribution on possible monetary losses an organization may realize over a given window of time. From this distribution, the Cybervar Calculator 400 computes the cybervar value. Input Processor 100, Dynamic Bayesian Network Constructor 200, Sampler 300, and Cybervar Calculator 400 may be one or more modules. For example, Input Processor 100, Dynamic Bayesian Network Constructor 200, Sampler 300, and Cybervar Calculator 400 may be implemented on one or more computing systems, one or more computing devices, as one or more programs, or as instructions on one or more machine readable media.

1. Input Structure

Figure 3:
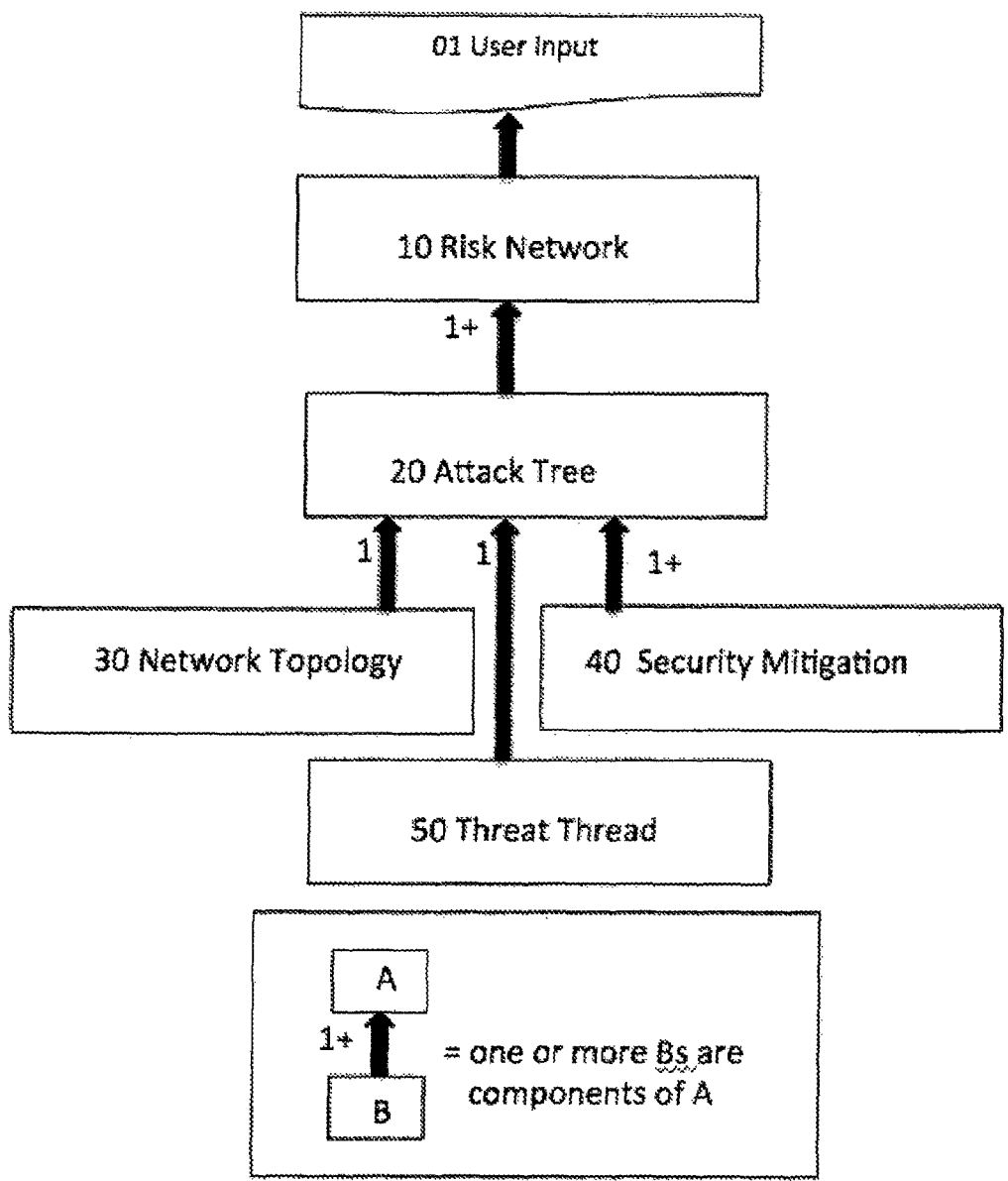
FIG. 3 depicts an exemplary structure of a user input in accordance with one or more embodiments.

The User Input 01 provided to the Input Parser may comprise JSON-encoded text data. FIG. 3 depicts an exemplary structure of a user input in accordance with one or more embodiments. User Input 01 may comprise a Risk Network 10, which contains one or more Attack Trees 20, each of which may comprise a Network Topology 30, a set of Security Mitigations 40 distributed across the access nodes of the Network Topology, a Threat Thread 50, and an edge set specifying the relationships between threat stage nodes and access nodes, access nodes and mitigation nodes, and threat stage nodes and asset nodes.

1.1 Risk Network 10.

The top-level JSON schema for the specification of the Risk Network 10 may be as follows:

```
{
    "description" : "risk network",
    "type" : "array",
    "required" : true,
    "items" : {
        "title" : "attack tree UUID",
        "type" : "string",
        "required" : true
    }
}
```

Thus, a Risk Network may be a set of one or more attack tree instances, identified by their UUIDs. These trees will be merged by the apparatus to represent the overall risk network of the organization, for which the cybervar value is to be computed.

1.1 Attack Tree 20.

The structure of an Attack Tree 20 may be as follows:

```
{
    "description" : "attack tree instance",
    "type" : "object",
    "properties" : {
        "tree name" : {
            "title" : "the UUID for the attack tree", "type" :"string",
            "required" : true,
        },
        "threat_type" {
            "title" : "the type of threat thread represented by the tree
                instance",
            "type" : "string",
            "required" : true,
        },
        "threat UUID" {
            "title" : "the name (UUID) of threat thread represented by the tree
                instance",
            "type" : "string",
            "required" : true,
        } ,
        "threat vertices" {
            "title" : "threat stage vertex specification",
            "type" : "array",
            "required" : true,
            "items" : {
                "type" : "object",
                "properties" : {
                    "threat_stage_name" : {
                        "title" : "UUID of threat stage",
                        "type" : "string",
                        "required" : true,
                    }
                }
            }
        } ,
        "mitigation_vertices" : {
            "title" : "mitigation vertex specification",
            "type" : "array",
            "required" : true,
            "items" : {
                "type" : "object",
                "properties" : {
                    "mitigation_name" : {
                        "title" : "UUID of the mitigation ",
                        "type" : "string",
                        "required" : true,
                    }
                }
            } ,
        } ,
        "access vertices" : {
            "title" : "access vertex specification",
            "type" : "array",
            "required" : true,
            "items" : {
                "type" : "object",
                "properties" : {
                    "access name" : {
                        "title" : "UUID of the access node",
                        "type" : "string",
                        "required" : true,
                    }
                }
            }
        } ,
        "asset vertices" : {
            "title" : "asset vertex specification",
            "type" : "array",
            "required" : true,
            "items" : {
                "type" : "object",
                "properties" : {
                    "asset name" : {
                        "title" : "UUID of the asset node",
```

```
            "type" : "string",
            "required" : true,
          }
        }
      }
    },
    "edges" : {
      "title" : "edge specification",
      "type" : "array",
      "required" : true,
      "items" : {
        "type" : "object",
        "properties" : {
          "source_node_type" : {
            "title" : "type of the source node",
            "enum" : ["threat_stage", "mitigation", "access"],
            "required" : true,
          },
          "source node name" : {
            "title" : "UUID of the source node",
            "type" : "string",
            "required" : true,
          },
          "dest_node_type" : {
            "title" : "type of the destination node",
            "enum" : ["threat", "asset"],
            "required" : true,
          },
          "dest-node-name" : {
            "title" : "UUID of the destination node",
            "type" : "string",
            "required" : true,
          },
          "connectivity_types" : {
            "title" : "connective types of edge (for access-access
                edges)",
            "type" : "array",
            "items" : { "type" : "string" }
          }
        }
      }
    }
  }
}
```

Thus, an Attack Tree may comprise a tree name, threat thread, and type, together with list of the threat thread stages, mitigations, access nodes, and asset nodes that are applicable for the tree, and an edge set specification describing the relationships of the threat stage, mitigation, and/or access nodes to threat stage nodes and/or asset nodes (and connectivity types, for edges between access nodes). If different stages of a threat apply to the same element of an IT infrastructure, then the element may be represented by as many access nodes as there are stage nodes, with each access node carrying a distinct UUID (but the same name, if so desired). The graph must be directed and acyclic; the stages of a threat must form a path through the graph from the root to a leaf, and the ordering of the nodes within the path must be compatible with the ordering in the threat thread specification.

1.3 Threat Thread.

A Threat Thread may have the following structure:

```
{
  "description" : " A set of risk nodes representing the stages of a
     cyber threat",
  "type" : "object",
  "properties" : {
    "threat_type" : {
      "title" : "specifies a threat type to which the risk belongs",
      "type" : "string",
      "required" : true,
    },
    "threat_name" : {
      "title" : "the UUID of the threat thread instance",
      "type" : "string",
      "required" : true,
    },
    "intent_type" : {
      "title" : "specifies the intent type name associated to the threat
        instance",
      "type" : "string",
      "required" : true,
    },
    "threat_stages" : {
      "title" : "stages of the threat (ordered sequentially)",
      "type" : "array",
      "required" : true,
      "items" : {
        "type" : "stage_name",
      }
    },
    "default rate" : {
      "title" : "default base lambda rate for all stages",
      "type" : "float",
      "required" : true,
      "minimum" : 0.0,
      "exclusiveMinimum" : true,
    },
    "default_growth" : {
      "title" : "default growth constant for all stages",
      "type" : "float",
      "required" : true,
    },
    "targets" : {
      "title" : "list of types of asset nodes to which this threat stage
         applies,"
      "type" : "array",
      "items" : {
        "type" : "object",
        "properties" : {
          "asset_type" : {
            "title" : "type of the access node",
            "required" : true,
            "type" : "string",
          }
        }
      }
    },
  }
}
```
where "stage_name" may be:
```
{
  "description" : " A set of risk nodes representing the stages of a
     cyber threat",
  "type" : "object",
  "properties" : {
    "stage_type" : {
      "title" : "type of stage",
      "required" : true,
      "type" : enum ["reconnaissance", "initial", "persistence",
          "beaconing", "propagation", "exploitation", "exfiltration"],
    },
    "stage_name" : {
      "title" : "UUID for the threat thread stage node",
      "type"    "string",
      "required" : true,
    },
    "objective" : {
      "title" : "description of the stage objective",
      "type" : "string",
    },
    "child_prob_type" : {
      "title" : "type of probability when not a root node (lambda or
          parent accesses w/certainty or fixed m)",
      "type" : enum: [ "parent_access", "lamdba", "int"]
    },
    "base lambda" : {
      "title" : "initial lambda rate",
      "type"    "float",
```

```
    "minimum" : 0.0,
    "exclusiveMinimum" : true,
  },
  "growth" : {
    "title" : "constant for linear growth rate",
    "type" : "float",
  },
  "upper_bound" : {
    "title" : "maximum number of occurrences in any timestep -
      'parent' indicates limit to number of successes of prior threat
      stage node",
    "type"   enum ["int", "parent"] ,
  },
  "repeats" : {
    "title" : "stage may repeat as required",
    "type" : "true' ,
  },
  "transits" : {
    "title" : "upon invocation, stage sets status of parent node to 'not
      accessed' " ,
    "type"   "boolean",
  },
  "skippable" : {
    "title" : "node may be skipped in sequence of stages along any
      given attack path",
    "type" : "boolean",
  },
  "mechanisms" : {
    "title" : "mechanisms of action via which threat stage may be
      applied"
    "required" : true,
    "type" : "array",
    "items" : {
      "type" : "object ",
      "properties" : {
        "mechanism_type" : {
          "title" : "type of the mechanism",
          "type" : "string",
          "required" : true,
        },
        "connectivity_types" : {
          "title" : "connective types of the mechanism: required
            for propagation stages",
          "type" : "array",
          "items" : { "type" : "string" },
        },
        "defeats" : {
          "title" : "list of names of mitigations this threat stage
            defeats,"
          "type" : "array",
          "items": {
            "type" : "object",
            "properties" : {
              "mitigation_type" : {
                "title" : "type of the mitigation",
                "required" : true,
                "type" : "string",
              },
              "mitigation_qualifiers" : {
                "title" : "mitigation subtype
                  indicators",
                "type" : "array",
                "items" : {
                  "type" : "string',
                }
              }
            }
          }
        },
        "applies_to" : {
          "title" : " list of types of access nodes to which this
            threat stage applies,"
          "type" : "array",
          "items": {
            "type": "object",
            "properties" : {
              "access_type" : {
                "title" : "type of the access node",
                "required" : true,
                "type" : "string",
              },
              "access_qualifiers" : {
                "title" : "access subtype qualifier sets
                  (each set is an array of attack surface
                  designators)",
                "type" : "array",
                "items" : {
                  "type" : "array"
                  "items" : {
                    "type" : "string"
                  }
                }
              }
            }
          } //end applies-to
        } // end properties
      } // end items
    } // end mechanisms
  } // end properties
} // end stage_name
```

A threat thread may comprise a threat type name, a threat instance name (UUID across all threat instances), an associated intent type name, and a set of one or more threat stages. Each threat stage may comprise a stage type name, an instance name (UUID across all node types), an optional A value defining an initial Poisson distribution associated to the stage instance (or alternatively a prior stage-dependent or fixed number), and an optional linear growth rate constant c (when a /... value has been selected). The stage may also specify that it is skip-able and/or repeatable; these are an aid in automation of attack tree construction. Each stage also specifies one or more mechanisms of action, which in turn may specify a list of connectivity types. Each mechanism of action may specify a list of access nodes types (with subtype qualifiers) for which the stage is applicable (this type and qualifier information serves to define the "attack surface" types recognized by the threat). One or more arrays of strings may be specified. For the threat stage node to apply to an access node, it must have one array of qualifiers such that all qualifiers in the array are associated with the access node. Qualifier strings are intended to represent operating system types (e.g., "Windows7" or "RedHat5"), application types (e.g. "Adobe" or "MS Word"), or specific vulnerabilities (e.g. "CVE-123"). Each mechanism may also specify a list of mitigation types (with subtype qualifiers) that the mechanism is assumed to defeat. Finally, the threat thread may specify a default (/..., c) pair for use in all stages where stage-specific values are not provided.

1.4 Mitigation Node.

A Mitigation Node may have the following structure:

```
{
  "description" : " cyber threat mitigation "
  "type" : "object",
  "properties" : {
    "mitigation_type" : {
      "title" : "type name for the mitigation",
      "type" : "string",
      "required" : true,
    },
    "mitigation_name" : {
      "title" : "UUID for the mitigation node instance",
      "type" : "string",
      "required" : true,
    },
```

-continued

```
"mitigates" : {
    "title" : "threat threads/stages mitigated",
    "type" : "array",
    "required" : true,
    "items" : {
      "type" : "object",
      "properties" : {
      "threat_type" : {
        "title" : "threat type mitigated",
        "required" : true,
        "type" : "string",
      },
      "stage_type" : {
        "title" : "type of stage mitigated",
        "type" : "string",
      },
      "action_type' : {
        "title" : "mechanism of action mitigated",
        "type" : "string",
      },
      "effectiveness" : {
        "title" : "effectiveness of mitigation for threat thread /
          stage (enter 0 if mitigation only applicable post-
          infection) ",
        "type" : "float",
        "minimum"  0.0,
        "maximum" : 1.0,
      },
      "post_infect_effectiveness" : {
        "title" : "effectiveness of mitigation for threat thread /
          stage, post-infection",
        "type" : "float",
        "minimum" : 0.0,
        "maximum" : 1.0,
      }
     }
    }
  },
  "applies_to"
    "title" : "list of types of access nodes to which this mitigation
      applies,"
    "type" : "array",
    "items" : {
      "type" : "object",
      "properties" : {
        "access_type" : {
          "title" : "type of the access node",
          "required" : true,
          "type" : "string",
        },
        "access_qualifiers" : {
          "title" : "access subtype qualifiers",
          "type" : "array",
          "items: {
            "type" : "string",
          }
        }
      }
    }
  },
  "default_effectiveness" : {
    "title" : "default effectiveness likelihood for all mitigated threats",
    "type" : " float ",
    "required" : true ,
    "minimum" : 0.0 ,
    "maximum" : 1.0 ,
  }
}
```

A Mitigation node may comprise a description, a mitigation type, a mitigation instance name and UUID, and a list of (possibly qualified) Threat Stage nodes (with methods of action mitigated, and the mitigation effectiveness). If the mitigation provides a capability to remove a threat post-successful access, the effectiveness of this capability may also be specified. A list of (possibly qualified) access nodes types for which the mitigation may be a parent node is also provided. Finally, a default effectiveness rate may be specified (to be used for mitigated Threat Stage nodes for which a threat-specific effectiveness is not indicated).

1.5 Access Node.

An Access Node may have the following structure:

```
{
  "description" : " cyber threat access node"
  "type" : "object" ,
  "properties" : {
    "access_type" : {
      "title" : "type name for the access node" ,
      "type" : "string" ,
      "required" : true ,
    },
    "access_name" : {
      "title" : "the UUID of the access node instance" ,
      "type" : "string" ,
      "required" : true ,
    },
    "access_qualifiers" : {
      "title" : "access subtype qualifiers" , "type" : "array" ,
      "items : {
        "type" : "string" ,
      }
    },
  }
}
```

An Access Node may comprise an access type name, an access instance name (UUID across all node types), and a list of access type qualifiers (which may be used to denote properties such as the hardware and software information applicable to the node; they serve to specify the attack surface type presented by the asset node in its role as target of the parent attack stage). In one or more embodiments, if an access node A specifies a threat stage node T as a parent, then the following constraints must be satisfied:

1. If A is of access node type t, then there must be an entry m in the "mechanisms" list of T, such that there is an entry em in the "applies_to" list of m, such that em specifies an "access_type" of t.

2. If A specifies a qualifier set S, then the entry em must have a qualifier set Qj in its "access_qualifiers" array such that Q/:;:,.s and Q/0.

Similarly, if A specifies a mitigation node as a parent, then the following constraints must be specified:

1. If A is of access node type t, then there must be an entry e in the "applies_to" list of for an access node of type t.

2. If A specifies a qualifier set S, then the entry e must have a qualifier set Qj in its "access qualifiers" array such that Q/:;,.s and Q/0.

3. If A has a parent threat stage node T, then the "mechanisms" entry m of T, satisfying the constraints on T, has a "mechanism_type" r such that includes in its "mitigates" list an entry matching the pair (T,r).

4. If A has a parent threat stage node T, then no "mechanisms" entry m of T, satisfying the constraints on T, may include an entry d in its "defeats" list, such that d specifies a "mitigation_type" matching the "mitigation_type" of _____ and has a non-empty set Q" of mitigation qualifiers such that Q"EQ where Q denotes the mitigation qualifiers of 1.6 Asset Node.

An Asset Node may have the following structure:

```
{
  "description" : "asset node (target of cyber threat) "
  "type" : "object" ,
```

-continued

```
"properties" : {
  "asset_type" : {
    "title" : "type name for the asset node",
    "type" : "string",
    "required" : true,
  },
  "asset_name" : {
    "title" : "UUID for the asset node",
    "type" : "string",
    "required" : true,
  },
  "drawdown_rate" : {
    "title" : "percentage by which single cyber incident decreases
       value",
    "type" : "float",
    "required" : true,
    "minimum" : 0.0,
    "maximum" : 1.0,
  },
  "initial_value" : {
    "title" : "initial value of the asset",
    "type" : "float",
    "required" : true,
    "minimum" : 0.0,
  },
 }
}
```

An Asset Node may comprise an asset type name, an asset instance name (UUID across all node types), and a drawdown rate (the percentage by which successful cyber attack against the asset, at any given simulation time-step, reduces the asset's value).

2. DBN Construction (Input Parser 100 and Network Constructor

The Input Parser 100 may be a embodied as one or more software modules which parse an input, e.g. the input described above, and represent it in computer memory as a set of Directed Acyclic Graphs (DAGS) instances, in which each vertex may represent a Threat Stage, Mitigation, Access, or Asset Node. The one or more software modules may be written in Python, and each vertex may represent a Threat Stage, Mitigation, Access, or Asset Node labeled with a Python data structure containing the node-specific data specified in the input. Although exemplary embodiments may be described as being implemented in Python, various programming languages may be employed to implement the one or more software modules and/or to otherwise implement the methodologies described herein. These languages may include, but are not limited to, Java, C++, C, C#, etc. The Input Parser may be embodied as a program, e.g. an executable program invoked from the command line of a computer system or a program invoked via a graphical or web-based interface. In one or more embodiments, the edge set information for Threat Stage and Access Stage nodes may be omitted from the User Input File 01, in which case the Input Parser may construct a maximal set of Attack Trees (DAGs) containing all legal edges between Threat Stage and Access Nodes, as constrained by the qualifier information provided in the User Input File.

The DBN Network Constructor 200 may associate to each vertex a table-oriented data structure, representing a discrete, conditional probability distribution (e.g. with one column per possible value of the vertex, and one row for each possible combination of parent values). The association may be performed according to a topological ordering of the graph, with the conditions for a given vertex corresponding to the possible values that are taken by the variables represented by its parent vertices. For each input Attack Tree, the distributions may be constructed as follows:

Each Threat Stage node may be assigned a distribution according to the following rules:

(T.S. 1) If the Node does not have a parent access node, then its corresponding probability distribution shall be Poisson, with time-dependent parameter '$\Lambda(t)$, and shall give the odds that n attacks will be initiated by the node between times t and t+1. The value n is bounded by an upper bound M specified for the Node in the User Input File.

(T.S. 2) If a Threat stage Node has a parent access node a, and n(a,t) denotes the number of successful accesses of the parent at time t, then based on the input specifications, the distribution is either (i) Poisson as in (1), or (ii) n(a,t) with certainty, or (iii) a positive integer m with certainty (nonzero if and only if n(a,t) is greater than zero).

Each Mitigation Node may be assigned a distribution according to the following rules:

(M 1) The Node is assigned a default probability P (specific to the node) giving the odds of it thwarting any single instance of any Threat Stage node attack on an Access Node for which the Mitigation Node is a parent.

(M 2) For each specification of a pair} of Threat Stage type and mechanism of access provided for the Mitigation Node as part of its Mitigates data, a specific probability P_j may be assigned, giving the odds of the Mitigation Node stopping any instance of an attack, characterized by the pair j, on an Access Node for which the Mitigation Node is a parent.

Each Access Node having an incoming edge from a Threat Stage Node, and N incoming edges from Mitigation Nodes, may be assigned a probability distribution via the following rules:

(Ac 1) If the Node was not accessed at time t−1, then the odds of 1 or more successful access at time t are given by:

$$P = \sum_{n=1}^{n=M} \frac{\lambda_t^n}{n!} e^{-\lambda_t} [1 - (1 - (1 - M_{j_1})(1 - M_{j_2}) \ldots (1 - M_{j_N}))^n],$$

where as above, M is an upper bound on the possible attack attempts on the node at time t, $\lambda(t)$ is the Threat Stage Node's Poisson parameter, and $M_{j_1}, M_{j_2}, \ldots M_{j_N}$ denote the respective probabilities of effectiveness of the parent Mitigation Nodes.

(Ac 2) If the Node was accessed at time t−1, and has parent Mitigation Nodes having post-infection effectiveness rates, then the distribution takes the form $$P_{A_k}(A_{k,t} = 1 \mid t) = (1 - M_{j_1})(1 - M_{j_2}) \ldots (1 - M_{j_N}),$$

where the $M_{j_1}$ are now the post-infection effectiveness rates (which may be 0).

Each Asset node, having drawdown rate dV as specified in the User Input File, is assigned a distribution according to the following rules:

(As 1) If the node has a parent Access Node which is in the "accessed" state at time t, and the Asset Node has remaining value V, then the probability of the value being decreased to V*dV is 1 with certainty. The odds of losing dV are 0 otherwise.

3. Sampling.

Once the input specification has been parsed into memory and decorated with conditional probability distributions, repeated sampling over the resulting DBNs, performed by the Sampler 300, is performed to compute the cybervar value. As the state of a DBN is dependent on the time-step, we use B_0 to denote the starting state of a DBN, B→ to denote its time evolution rules (as given by the input specification in terms of the growth rates and other parameters for the Threat Stage Nodes), and (B_0, B→) to denote the pair of a starting state and time evolution rule. B_t may denote the collective state of the DBNs at time t. The following algorithm, expressed in pseudo-code, describes an exemplary sampling process. In addition to the union of DBNs constructed in memory, the Sampler may require additional user input values, which are presented by the user to the Input Parser, together with the JSON input specification file.

```
procedure Sample (N = number of trials desired, T = number of time
steps, C = U (B_0, B→) = union of all attack trees)
   // for each trial
   for n = 0 ... (N- 1) do
      output = [ ]    an array to store output values
      evidence = { } dictionary holding state info for DBNs
      // for each time step
      for t = 0 ... ( T-1) do
         // sample each DBN at the current time step
         sample <- randomsample(B_t, evidence)
         // for each access node in each DBN
         for access_node in sample do
            // if node is the "accessed" state
            if sample[access_node] == 'accessed' then
               // if the node "stays accessed" once accessed
               if (parent threat node).transit == false then
                  // add node to list of nodes in accessed state
                  evidence <- evidence U {access_node : "accessed"}
               endif
            endif
         endfor
         // drawn down value of any asset nodes having parents that
         // are accessed
         for assetnode in sample do
            if exists parent of asset node in state accessed then
               assetnode.value[t] <- asset_node.value[t] * asset node.dV
            endif
         endfor
         // update threat stage nodes based on growth rates
         for each threat_node in sample do
            if threat_node is root of B_t or has accessed parent
               threat-node.lamba <- threat-node.lambda + threat_node.growth
            endif
         endfor
      endfor // end of time-step loop
      total loss = sum over all asset nodes a of a.value[O] – a.value[T]
      output <- output U total loss
   endfor   // end of all trials-
   output < output sorted low to hi
end procedure
function randomsample(B t, evidence)
   sample = { }
   for node in B_t do
      if node is in evidence then
         // if we have evidence for this node, add its id and current
         // value to our sample
         sample = sample U   {node: evidence[node] }
      else
         outcome <- value for node drawn according to node's probability
            distribution, conditioned on current parent values for node
         sample = sample U   {node: evidence[node] }
      endif
   endfor
   return sample
end function
```

4. Cybervar Computation.

The CyberVar Calculator 400 consumes the output of the Sampler, which may be an array values [ ] of N real values [O] through values [N-1], and may be sorted in ascending order. The Calculator may also accepts as input a value P, where o<P<10 0, giving the desired confidence interval for the cybervar computation, as passed by the user to the Input Parser. The Calculator produces the output cybervar=values [floor (N(I-P/10 0))] where floor (r) denotes the integer value closet to, but not greater than, r. This may be the cybervar value. In embodiments of the apparatus, the value may be output to a user or to one or more programs. In some embodiments, the value may be output to a display device, e.g. to the command line. Alternatively or additionally, the contents of the values [ ] array maybe binned, and presented as a histogram in a window of a graphical user interface, with the cybervar value presented in a graphical user interface or diagram, as a marked point in a histogram given by a suitable binning of the values [ ] array.

One skilled in the art will recognize that the framework supports much more complicated scenarios than that presented in the foregoing example, and the disclosed methods, systems, and media include the ability to compute the cybervar value for these scenarios.

In some implementations, the techniques discussed above may assign a monetary value to risk. In addition to modeling threat evolution, or identifying specific vulnerabilities and characterizing the severity of the threats that can exploit them, the system can estimate monetary costs of threat evolution. As a result, the models may be used in organizational financial risk assessment activities. The techniques above can thus couple a robust risk modeling framework with value at risk quantitative risk analysis techniques. For example, confidence intervals and other measures of value at risk can be provided as monetary amounts, e.g., in terms of dollars or dollar-denominated assets. However, this disclosure is not limited to such valuation techniques, and may apply to or use any type of monetary value, currency, denomination, or valuation standard. These techniques describe herein may be of use to a variety of users, including chief information officers or chief financial officers, who seek to understand the financial risks to which their organizations are exposed due to potential cyber attaches, and the comparative risk-reduction benefits of alternative computer security strategies.

Figure 4:
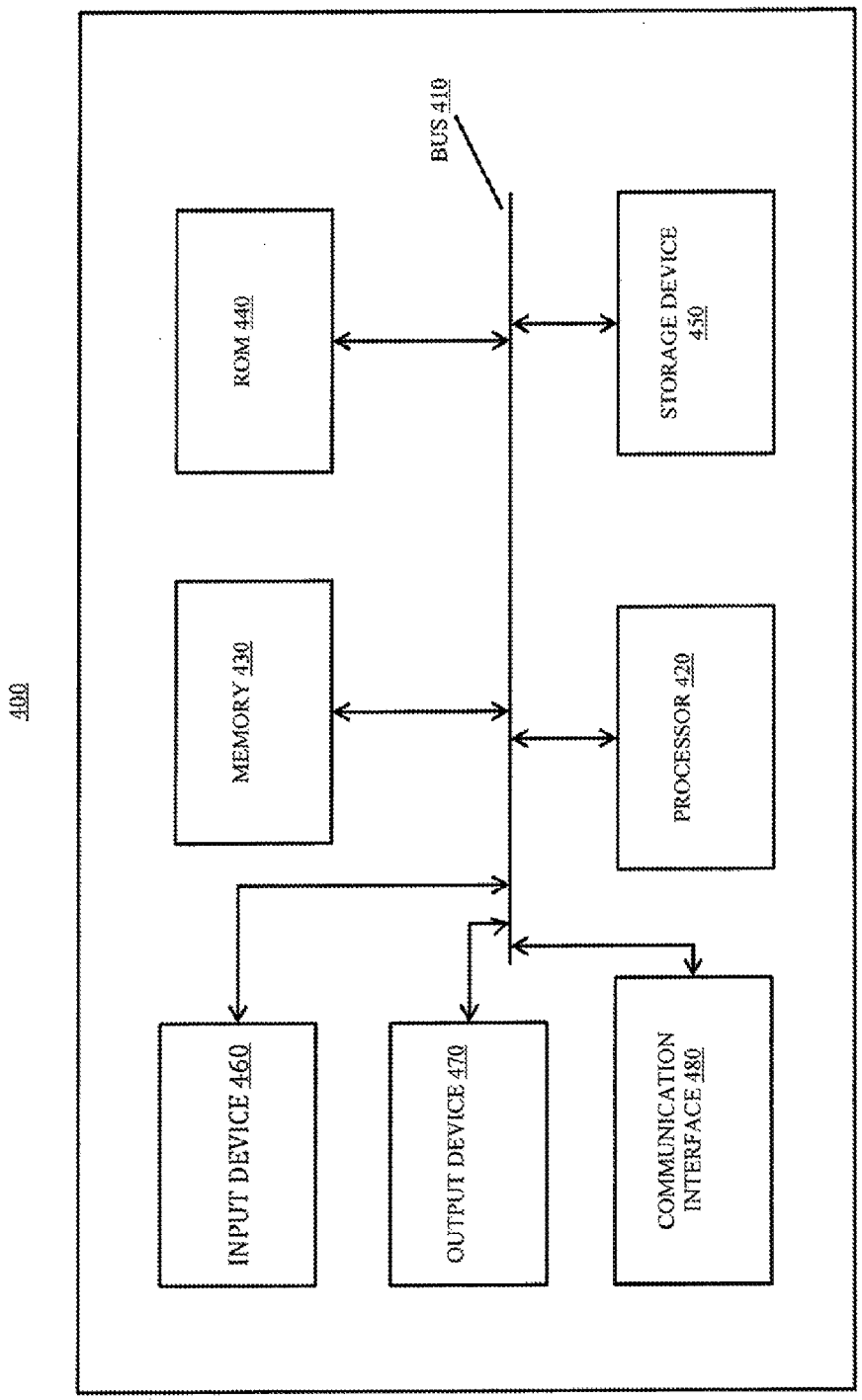
FIG. 4 depicts an exemplary architecture for implementing a computing device in accordance with one or more embodiments.

FIG. 4 depicts an exemplary architecture for implementing a computing device 400 in accordance with one or more embodiments, which may be used to implement any of modules described herein, or any other computer system or computing device component thereof. It will be appreciated that other devices that can be used with the computing device 400, such as a client or a server, may be similarly configured. As illustrated in FIG. 4, computing device 400 may include a bus 410, a processor 420, a memory 430, a read only memory (ROM) 440, a storage device 450, an input device 460, an output device 470, and a communication interface 480.

Bus 410 may include one or more interconnects that permit communication among the components of computing device 400. Processor 420 may include any type of processor, microprocessor, or processing logic that may interpret and execute instructions (e.g., a field programmable gate array (FPGA)). Processor 420 may include a single device (e.g., a single core) and/or a group of devices (e.g., multicore). Memory 430 may include a random access memory (RAM) or another type of dynamic storage device that may store information and instructions for execution by processor 420. Memory 430 may also be used to store temporary variables or other intermediate information during execution of instructions by processor 420.

ROM 440 may include a ROM device and/or another type of static storage device that may store static information and instructions for processor 420. Storage device 450 may include a magnetic disk and/or optical disk and its corresponding drive for storing information and/or instructions. Storage device 450 may include a single storage device or multiple storage devices, such as multiple storage devices operating in parallel. Moreover, storage device 450 may reside locally on the computing device 400 and/or may be remote with respect to a server and connected thereto via a network and/or another type of connection, such as a dedicated link or channel.

Input device 460 may include any mechanism or combination of mechanisms that permit an operator to input information to computing device 400, such as a keyboard, a mouse, a touch sensitive display device, a microphone, a pen-based pointing device, and/or a biometric input device, such as a voice recognition device and/or a finger print scanning device. Output device 470 may include any mechanism or combination of mechanisms that outputs information to the operator, including a display, a printer, a speaker, etc.

Communication interface 480 may include any transceiver-like mechanism that enables computing device 400 to communicate with other devices and/or systems, such as a client, a server, a license manager, a vendor, etc. For example, communication interface 480 may include one or more interfaces, such as a first interface coupled to a network and/or a second interface coupled to a license manager. Alternatively, communication interface 480 may include other mechanisms (e.g., a wireless interface) for communicating via a network, such as a wireless network. In one implementation, communication interface 480 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 400 may perform certain functions in response to processor 420 executing software instructions contained in a computer-readable medium, such as memory 430. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Figure 5:
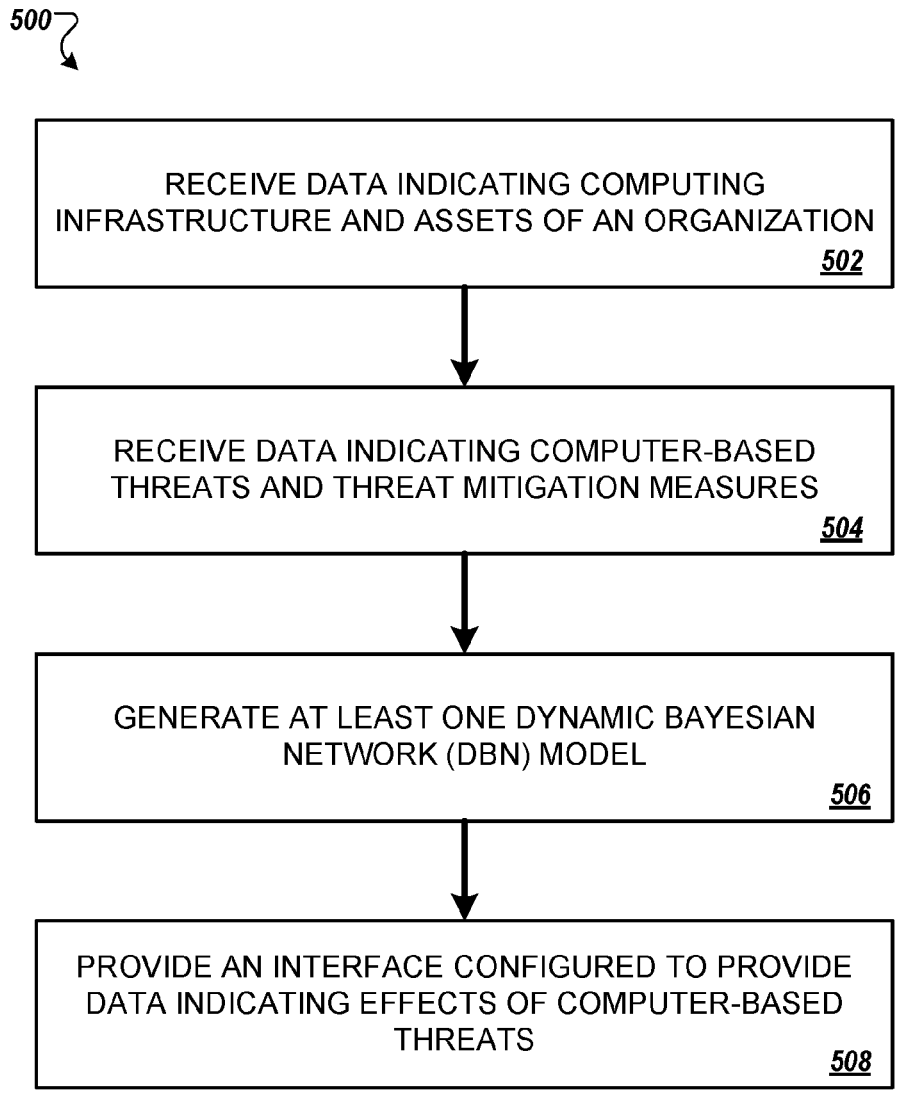
FIGS. 5-6 depicts flowcharts showing examples of processes for assessing cyber threats.

FIG. 5 illustrates a flowchart showing an example of a process 500 for assessing cyber threats. The process 500 illustrates an example of techniques that may be performed by one or more computers, e.g., assessment system 85 from FIG. 1A or computing device 400, to create and use a model for the risks of cyber threats to an organization.

Data indicating computing infrastructure of an organization and assets of the organization is received (502). Data indicating computer-based threats to the organization and threat mitigation measures of the organization is received (504). The data can be received from one or more client devices over a network. The data may be received in one or more JSON-encoded text files.

At least one dynamic Bayesian network (DBN) is generated (506). Different DBN models can be generated for different organizations, which have different computing infrastructure and different assets. The DBN may include (i) infrastructure nodes representing the computing infrastructure of the organization, (ii) asset nodes indicating characteristics of the assets of the organization, (iii) threat nodes representing the computer-based threats, and (iv) mitigation nodes representing the threat mitigation measures of the organization. Each of the nodes can include parameter values for a number of parameters, and the DBN indicating relationships among the nodes. For example, threat nodes can be assigned probability scores indicating likelihoods of success of different types of cyber attacks. Similarly, mitigation nodes can be assigned scores that decrease the likelihood that the threats are effective in breaching an organization in a simulation. The DBN can indicate which nodes are connected, and may indicate directions that data flows within the DBN. Similarly, the DBN may indicate how various nodes interact, e.g., how state values for different nodes are calculated and propagated to affect the states of other nodes.

In some implementations, the infrastructure nodes indicate (i) a network topology for the organization and (ii) individual deployed hardware, operating system, and application software units of the organization. The infrastructure nodes indicate aggregations of networked computing devices of the organization.

In some implementations, the threat nodes may indicate a set of multi-stage computer-based threats. For at least one of the multi-stage threats, the threat nodes are defined to indicate a mode of operation of the threat, a vulnerability exploited by the threat, and a rate of incidence of the threat. The characteristics of each threat node, such as the rate of incidence or rate of success, may be stored as assigned parameter values of the node. Each of the multi-stage computer-based threats may be represented in the DBN by multiple threat nodes. The multiple threat nodes can indicate characteristics of different stages of the computer-based threat corresponding to a different time period as an attack progresses. Examples of computer-based threats that can be represented by the threat nodes include viruses, malware, network intrusions, data theft, and denial of service attacks.

In some implementations, the mitigation nodes represent hardware, software, personnel-based, physical, or organizational security mitigations that are deployed by the organization. The mitigation nodes may specify one or more rates of effectiveness against particular types of computer-based threats. The mitigation nodes may represent one or more mitigations from the set consisting of an antivirus system, a network intrusion detection system, a firewall, a software patching process, a training program, a training program, a permission restriction scheme or access restriction scheme, a content-filtering process, an event logging process, a physical restriction, and an application whitelist.

In some implementations, the asset nodes indicate locations and value of data assets of the organization, wherein the data assets comprises at least electronic documents and personally identifying information. For example, the asset nodes may represent an amount of value that would be lost if the data assets were stolen or otherwise compromised.

An interface is provided, where the interface is configured to provide data generated using the DBN that indicates effects of computer-based threats on the organization (508). The interface can be an application programming interface for requesting data indicating effects of the computer-based threats on the organization. For example, a machine interface can be provided for invoking a remote procedure over a network, where the remote procedure uses the DBN to determine effects of the computer-based threats on the organization. In addition, or as an alternative, a user interface for requesting data indicating effects of the computer-based threats on the organization can be provided. For example, a system can provide, to a client device over a network, data for a user interface configured to receive user input initiating a procedure that uses the DBN to determine effects of the computer-based threats on the organization. The results of analysis using the DBN model can be provide through the interface.

In some implementations, data is accessed describing attack trees for different computer-based attacks. Each attack tree may include a graph describing interactions of a computer-based attack with one or more computers. Each graph may include multiple attack tree nodes that each represent a different stage of the computer-based attack. The DBN can be generated at least in part based on the attack trees. For example, various attack trees may be linked to other nodes to represent potential effects of the attacks on the infrastructure and assets of the organization. Each stage of a computer-based attack may be characterized by one of several possible states. One or more of the attack tree nodes is assigned a probability distribution that indicates a likelihood of the node's states conditioned on the states of the node's parents.

In some implementations, generating the DBN comprises generating the DBN to include a particular threat node representing a stage of a particular computer-based attack. The particular threat node can have a conditional probability that is time-dependent for a discrete time index and is conditioned on (i) current states of parent nodes for the particular threat node, and (ii) a previous state of the particular threat node.

Figure 6:
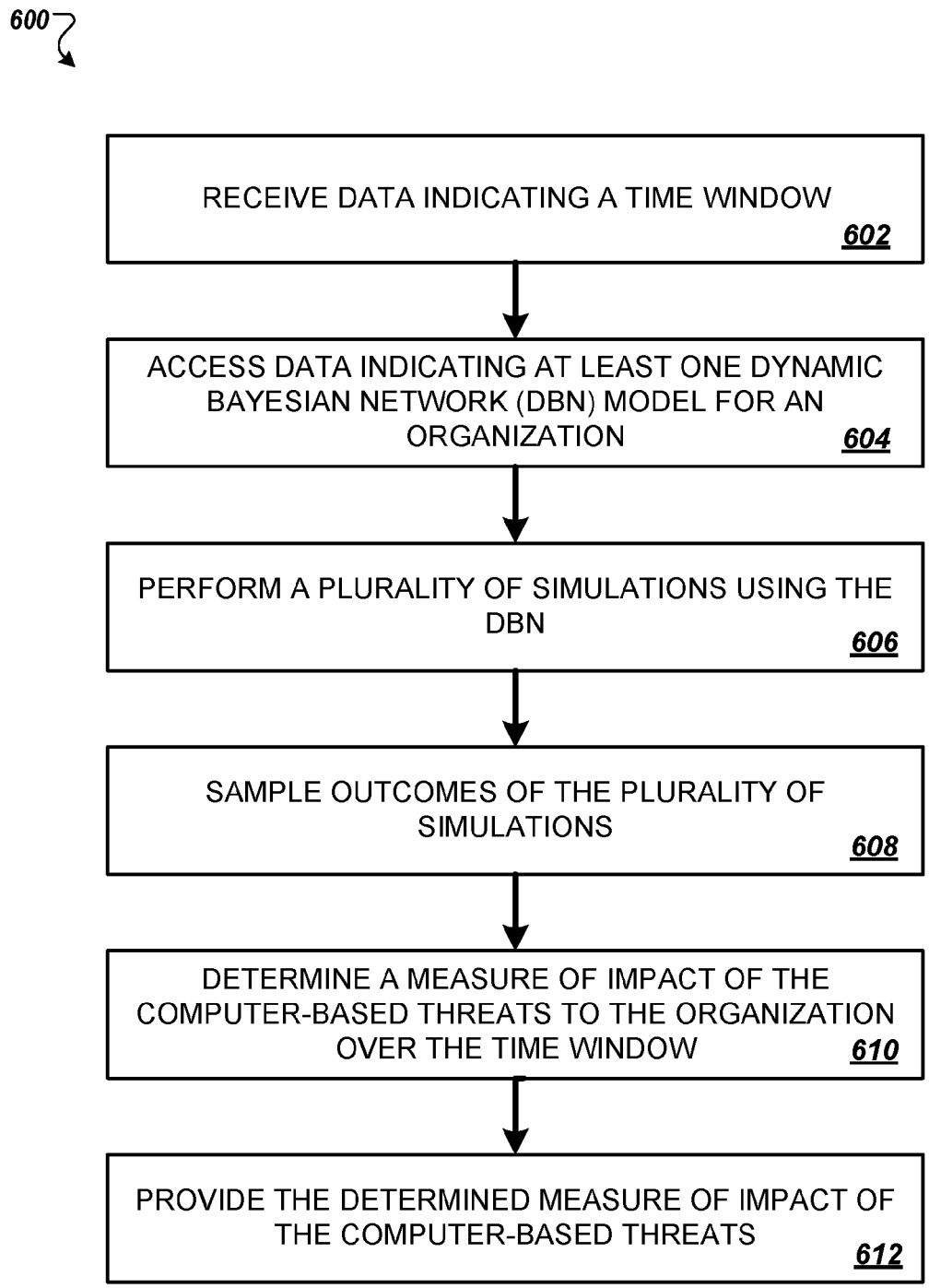

FIG. 6 illustrates a flowchart showing an example of a process 600 for assessing cyber threats. The process 600 illustrates an example of techniques that may be performed by one or more computers, e.g., the assessment system 85 from FIG. 1A or computing device 400, to use a DBN model such as the one generated in the process 500 to generate measures of risks of cyber threats to an organization.

Data indicating a time window is received (602). For example, a user may specify a future time period, such as the next month, the next year, or the next 5 years. This information may be provided locally or by a remote system over a network. The assessment system may then determine a number of time steps that are included in the time window. For example, each DBN may be generated with each time index representing a specified amount of time, such as a day, a week, or a month.

Data indicating at least one dynamic Bayesian network (DBN) is accessed (604). The DBN can specify relationships among (i) infrastructure nodes representing the computing infrastructure of an organization, (ii) asset nodes indicating characteristics of the assets of the organization, (iii) threat nodes representing the computer-based threats, and (iv) mitigation nodes representing threat mitigation measures of the organization. The DBN and its nodes and connections can have other features as discussed above.

In some implementations, a particular cyber threat is represented in the DBN as a set of multiple threat nodes, where each of the multiple threat nodes represents characteristics of a different stage of a threat as it progresses and expands In some implementations, the DBN represents a conditional probability distribution of each random variables is time-dependent for a discrete time index, and values determined for at least some of the nodes are conditioned on (i) the values of the node's parents at a current time index, and (ii) values determined for the node for one or more prior time indexes.

A plurality of simulations are performed using the DBN (606). Each simulation can involve propagating data through the DBN for various time steps within the time window. Outcomes of the plurality of simulations are sampled according to the state of the DBN representing the end of the time window (608). Performing the plurality of simulations and sampling the outcomes can include performing Monte Carlo simulations and sampling of the DBN. The Monte Carlo simulations may be conducted to determine a distribution of a total value that may be lost to the threats represented by the threat nodes, over the time window. To achieve an appropriate level of accuracy, the system can determine a threshold value indicating a minimum level of accuracy required. The system can also determine a number of simulations needed to reach the minimum level of accuracy indicated by the threshold value. At least the determined number of simulations is performed to achieve the desired accuracy level.

Based on the sampled outcomes of the simulations, a measure of impact of the computer-based threats to the organization over the time window is determined (610). The measure may include a confidence interval for losses of the organization due to the computer-based threats.

The measure of impact of the computer-based threats to the organization over the time window is provided (612). The measure can be an estimated amount of value at risk due to a set of cyber threats over the time window. This value may be expressed in a variety of ways, including a confidence interval, e.g., a range of losses such that there is a specified probability, e.g., 90%, 95%, or another probability value, that the actual loss will fall within the range. Thus boundaries of the confidence interval range can be provided as the measure in some implementations. Other measures, such as an average value, can additionally or alternatively be provided. These measures can be provided locally at the assessment system and/or to other devices over a network.

In some implementations, each asset node has an amount of value assigned. Performing the plurality of simulations involves, for each of the plurality of the simulations, determining whether a computer-based threat is successful in accessing the asset nodes in the simulation. Sampling outcomes of the plurality of simulations comprises, for each simulation, determining a combined amount of value for the asset nodes that were determined to be accessed by the computer-based threats during the simulation.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible or non-transitory storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

It also is to be appreciated that the described embodiments illustrate exemplary implementations, and that the content of the figures or operations described herein may be implemented as variations of the exemplary embodiments without departing from the spirit of the invention. For instance, the steps may be performed in a differing order, or steps may be added, deleted or modified. All of these variations are considered a part of the present disclosure.

Some of the figures may include a flow diagram. Although such figures may include a particular logic flow, it can be appreciated that the logic flow merely provides an exemplary implementation of the general functionality.

Further, the logic flow does not necessarily have to be executed in the order presented unless otherwise indicated. In addition, the logic flow may be implemented by a hardware element, a software element executed by a processor, or any combination thereof.

While various exemplary embodiments have been described above, it should be understood that they have been presented by way of example only, and not limitation. Thus, the breadth and scope of the present disclosure should not be limited by any of the above-described exemplary embodiments.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A system comprising:
   one or more computers comprising one or more hardware processors;
   one or more computer-readable media storing instructions that, when executed by the one or more computers, cause the one or more computers to perform operations comprising:
      receiving, by the one or more computers, data indicating a time window having a beginning and an end;
      accessing, by the one or more computers, data indicating at least one dynamic Bayesian network (DBN) that specifies relationships among (i) infrastructure nodes representing computing devices of an organization and a network connecting the computing devices, (ii) asset nodes indicating characteristics of assets of the organization, (iii) threat nodes representing computer-based threats including at least one selected from the group consisting of a virus, malware, a network intrusion, and a denial of service attack, and (iv) mitigation nodes representing threat mitigation measures of the organization;
      performing, by the one or more computers, a plurality of simulations using the DBN, each simulation involving propagating data through the DBN for various time steps within the time window;
      sampling, by the one or more computers, outcomes of the plurality of simulations according to the state of the DBN representing the end of the time window;
      based on the sampled outcomes of the simulations, determining, by the one or more computers, a measure of impact of the computer-based threats to the organization over the time window; and
      providing, by the one or more computers and for output to a user, a graphical representation of the determined measure of impact of the computer-based threats to the organization over the time window in a graphical user interface.

2. The system of claim 1, wherein determining the measure of impact of the computer-based threats comprises determining a confidence interval for losses of the organization due to the computer-based threats.

3. The system of claim 1, wherein each asset node has an amount of value assigned;
   wherein performing the plurality of simulations comprises, for each of the plurality of the simulations, determining, based on parameters assigned to the threat nodes and the mitigation nodes, whether at least one of the computer-based threats is successful in accessing the asset nodes;
   wherein sampling outcomes of the plurality of simulations comprises, for each simulation, determining a combined amount of value for the asset nodes that were determined to be accessed by the computer-based threats during the simulation.

4. The system of claim 1, wherein performing the plurality of simulations and sampling the outcomes comprise performing Monte Carlo simulations and sampling of the DBN.

5. The system of claim 4, wherein the Monte Carlo simulations are conducted to determine a distribution of a total value that may be lost to the threats represented by the threat nodes, over the time window.

6. The system of claim 1, wherein the operations further comprise:
   determining a threshold value indicating a minimum level of accuracy; and
   determining a number of simulations needed to reach the minimum level of accuracy indicated by the threshold value; and
   wherein performing the plurality of simulations comprises performing at least the determined number of simulations.

7. The system of claim 1, wherein a particular computer-based threat of the computer-based threats is represented in the DBN as a set of multiple threat nodes, each of the multiple threat nodes representing characteristics of a different stage.

8. The system of claim 1, wherein the DBN represents a conditional probability distribution of each random variables is time-dependent for a discrete time index, and values determined for at least some of the nodes are conditioned on (i) the values of the node's parents at a current time index, and (ii) values determined for the node for one or more prior time indexes.

9. A method performed by one or more computers, the method comprising:
   receiving, by the one or more computers, data indicating a time window having a beginning and an end;
   accessing, by the one or more computers, data indicating at least one dynamic Bayesian network (DBN) that specifies relationships among (i) infrastructure nodes representing computing devices of an organization and a network connecting the computing devices, (ii) asset nodes indicating characteristics of assets of the organization, (iii) threat nodes representing computer-based threats including at least one selected from the group consisting of a virus, malware, a network intrusion, and a denial of service attack, and (iv) mitigation nodes representing threat mitigation measures of the organization;
   performing, by the one or more computers, a plurality of simulations using the DBN, each simulation involving propagating data through the DBN for various time steps within the time window;
   sampling, by the one or more computers, outcomes of the plurality of simulations according to the state of the DBN representing the end of the time window;
   based on the sampled outcomes of the simulations, determining, by the one or more computers, a measure of impact of the computer-based threats to the organization over the time window; and
   providing, by the one or more computers and for output to a user, a graphical representation of the determined measure of impact of the computer-based threats to the organization over the time window in a graphical user interface.

10. The method of claim 9, wherein determining the measure of impact of the computer-based threats comprises determining a confidence interval for losses of the organization due to the computer-based threats.

11. The method of claim 9, wherein each asset node has an amount of value assigned;
   wherein performing the plurality of simulations comprises, for each of the plurality of the simulations, determining, based on parameters assigned to the threat nodes and the mitigation nodes, whether at least one of the computer-based threats is successful in accessing the asset nodes;
   wherein sampling outcomes of the plurality of simulations comprises, for each simulation, determining a combined amount of value for the asset nodes that were determined to be accessed by the computer-based threats during the simulation.

12. The method of claim 9, wherein performing the plurality of simulations and sampling the outcomes comprise performing Monte Carlo simulations and sampling of the DBN.

13. The method of claim 12, wherein the Monte Carlo simulations are conducted to determine a distribution of a total value that may be lost to the threats represented by the threat nodes, over the time window.

14. The method of claim 9, wherein the operations further comprise:
   determining a threshold value indicating a minimum level of accuracy; and
   determining a number of simulations needed to reach the minimum level of accuracy indicated by the threshold value; and
   wherein performing the plurality of simulations comprises performing at least the determined number of simulations.

15. The method of claim 9, wherein a particular computer-based threat of the computer-based threats is represented in the DBN as a set of multiple threat nodes, each of the multiple threat nodes representing characteristics of a different stage.

16. The method of claim 9, wherein the DBN represents a conditional probability distribution of each random variables is time-dependent for a discrete time index, and values determined for at least some of the nodes are conditioned on (i) the values of the node's parents at a current time index, and (ii) values determined for the node for one or more prior time indexes.

17. A non-transitory computer-readable medium storing instructions that, when executed by one or more computers, cause the one or more computers to perform operations comprising:
   receiving, by the one or more computers, data indicating a time window having a beginning and an end;
   accessing, by the one or more computers, data indicating at least one dynamic Bayesian network (DBN) that specifies relationships among (i) infrastructure nodes representing computing devices of an organization and a network connecting the computing devices, (ii) asset nodes indicating characteristics of assets of the organization, (iii) threat nodes representing computer-based threats including at least one selected from the group consisting of a virus, malware, a network intrusion, and a denial of service attack, and (iv) mitigation nodes representing threat mitigation measures of the organization;
   performing, by the one or more computers, a plurality of simulations using the DBN, each simulation involving propagating data through the DBN for various time steps within the time window;
   sampling, by the one or more computers, outcomes of the plurality of simulations according to the state of the DBN representing the end of the time window;
   based on the sampled outcomes of the simulations, determining, by the one or more computers, a measure of impact of the computer-based threats to the organization over the time window; and providing, by the one or more computers and for output to a user, a graphical representation of the determined measure of impact of the computer-based threats to the organization over the time window in a graphical user interface.

18. The non-transitory computer-readable medium of claim 17, wherein determining the measure of impact of the computer-based threats comprises determining a confidence interval for losses of the organization due to the computer-based threats.

19. The non-transitory computer-readable medium of claim 17, wherein each asset node has an amount of value assigned;
   wherein performing the plurality of simulations comprises, for each of the plurality of the simulations, determining, based on parameters assigned to the threat nodes and the mitigation nodes, whether at least one of the computer-based threats is successful in accessing the asset nodes;
   wherein sampling outcomes of the plurality of simulations comprises, for each simulation, determining a combined amount of value for the asset nodes that were determined to be accessed by the computer-based threats during the simulation.

20. The non-transitory computer-readable medium of claim 17, wherein performing the plurality of simulations and sampling the outcomes comprise performing Monte Carlo simulations and sampling of the DBN.

\* \* \* \* \*